United States Patent
Egedal et al.

(10) Patent No.: US 11,891,983 B2
(45) Date of Patent: Feb. 6, 2024

(54) NOISE CONTROL OF WIND TURBINE

(71) Applicant: Siemens Gamesa Renewable Energy A/S, Brande (DK)

(72) Inventors: Per Egedal, Herning (DK); Tomas Rosenberg Hansen, Horsens (DK); Stefan Oerlemans, Herning (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/279,256

(22) PCT Filed: Sep. 10, 2019

(86) PCT No.: PCT/EP2019/074028
§ 371 (c)(1),
(2) Date: Mar. 24, 2021

(87) PCT Pub. No.: WO2020/064319
PCT Pub. Date: Apr. 2, 2020

(65) Prior Publication Data
US 2022/0049680 A1 Feb. 17, 2022

(30) Foreign Application Priority Data
Sep. 25, 2018 (EP) .................................... 18196477

(51) Int. Cl.
*F03D 7/02* (2006.01)
*F03D 7/04* (2006.01)

(52) U.S. Cl.
CPC ......... *F03D 7/0296* (2013.01); *F03D 7/0276* (2013.01); *F03D 7/042* (2013.01);
(Continued)

(58) Field of Classification Search
CPC ...... F03D 7/0276; F03D 7/0296; F03D 7/042; F03D 7/048; F05B 2270/101;
(Continued)

(56) References Cited

U.S. PATENT DOCUMENTS 8,426,994 B2 * 4/2013 Nielsen ................. F03D 7/0296
290/55
9,347,432 B2 * 5/2016 Herrig ..................... F03D 17/00
(Continued)

FOREIGN PATENT DOCUMENTS

CN 103842645 A 6/2014
WO 2010037387 A2 4/2010
(Continued)

OTHER PUBLICATIONS

Leloudas, Giorgos, "Optimization of Wind Turbines with respect to Noise," Master's Thesis Project supervised by Sorensen et al.; Thesis Danmarks Tekniske Universitet, Nov. 1, 2006; XP055356383; pp. 1-66; URL:http://www.dark-cosmology.dk/-giorgos/giorgosleloudas2006.pdf [retrieved on Mar. 20, 2017 from the Internet]; 2006; 66 pages.
(Continued)

*Primary Examiner* — Tulsidas C Patel
*Assistant Examiner* — Thomas K Quigley
(74) *Attorney, Agent, or Firm* — Schmeiser, Olsen & Watts LLP

(57) ABSTRACT

A method of adapting noise emission configurations of plural wind turbines, the method including: determining total wind turbine related noise levels at plural locations; determining, among the plural locations, a critical location having a most critical, in particular highest, total wind turbine related noise level; if the most critical total wind turbine related noise level is above a noise threshold:
(Continued)

Figure 1:
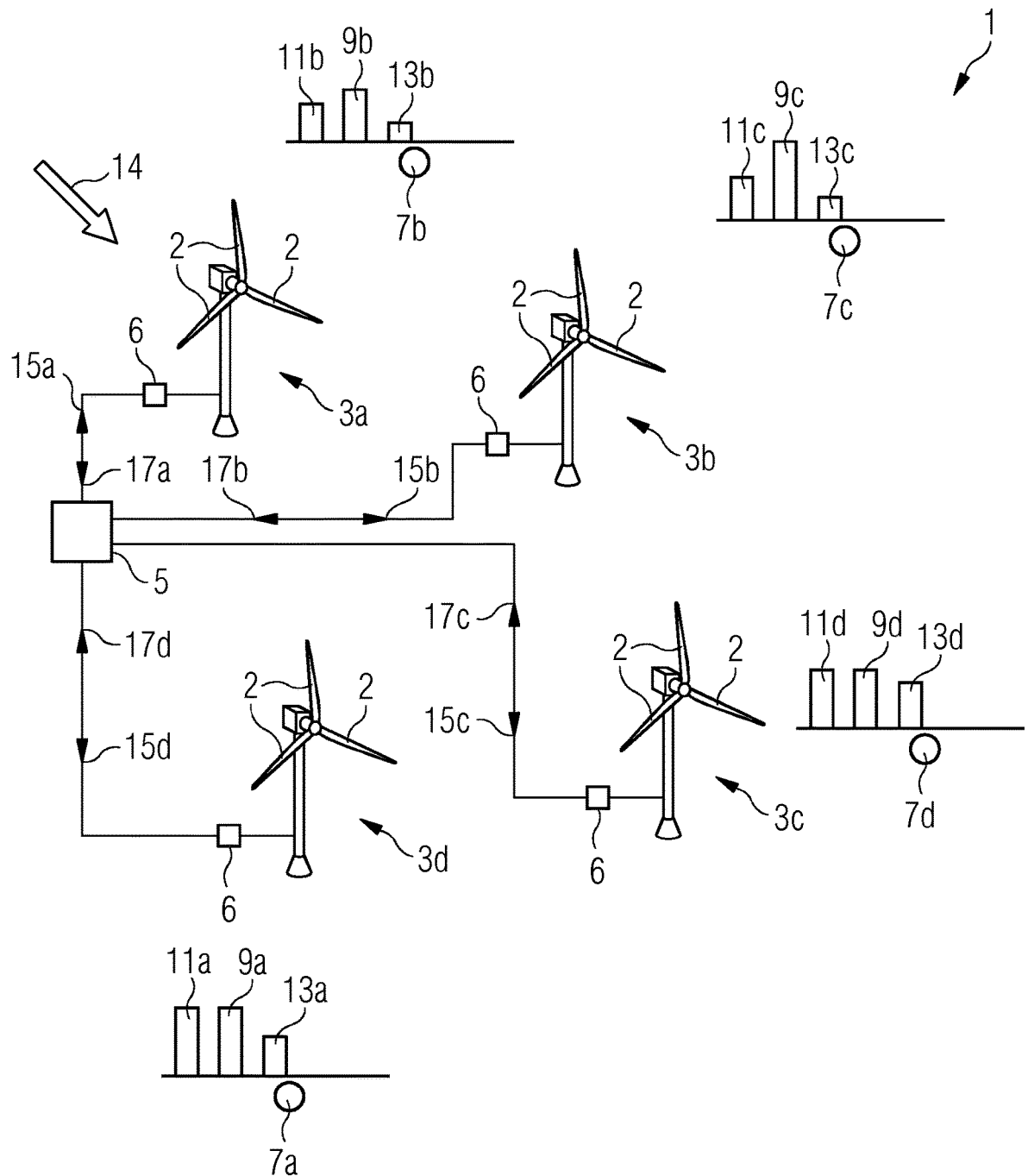

reducing the noise emission configuration of a wind turbine having the highest noise to power impact ratio, is provided.

16 Claims, 2 Drawing Sheets

(52) U.S. Cl.
CPC ........ *F03D 7/048* (2013.01); *F05B 2260/966* (2013.01); *F05B 2270/101* (2013.01); *F05B 2270/327* (2013.01); *F05B 2270/328* (2013.01); *F05B 2270/329* (2013.01); *F05B 2270/333* (2013.01)

(58) Field of Classification Search
CPC .......... F05B 2270/327; F05B 2270/328; F05B 2270/329; F05B 2270/333
See application file for complete search history.

(56) References Cited

U.S. PATENT DOCUMENTS

| | | | | |
|---|---|---|---|---|
| 10,697,431 | B2* | 6/2020 | Hammerum | ............ F03D 7/045 |
| 11,125,210 | B2* | 9/2021 | Gupta | ................... F03D 7/0224 |
| 2010/0133818 | A1* | 6/2010 | Kinzie | ................. F03D 7/0296 |
| | | | | 290/44 |
| 2011/0175356 | A1* | 7/2011 | Nielsen | ................ F03D 7/0296 |
| | | | | 290/44 |
| 2011/0223006 | A1* | 9/2011 | Loh | ........................ F03D 7/048 |
| | | | | 415/118 |
| 2013/0140818 | A1* | 6/2013 | Matesanz Gil | ......... F03D 7/048 |
| | | | | 290/44 |
| 2013/0209220 | A1* | 8/2013 | Nielsen | ................. F03D 7/0296 |
| | | | | 415/119 |
| 2014/0246856 | A1 | 9/2014 | Santiago Benito et al. | |
| 2016/0032892 | A1* | 2/2016 | Herrig | ..................... F03D 7/045 |
| | | | | 416/1 |
| 2016/0032893 | A1* | 2/2016 | Herrig | ..................... F03D 17/00 |
| | | | | 290/44 |
| 2019/0154000 | A1* | 5/2019 | Hammerum | ............ F03D 7/045 |
| 2019/0203694 | A1* | 7/2019 | Gupta | ................... F03D 7/0296 |
| 2019/0271295 | A1* | 9/2019 | Gupta | ................... F03D 7/0276 |
| 2020/0318611 | A1* | 10/2020 | Gupta | ................... F03D 7/0224 |
| 2020/0332767 | A1* | 10/2020 | Gupta | ..................... F03D 7/028 |
| 2020/0332768 | A1* | 10/2020 | Gupta | ..................... F03D 7/048 |

FOREIGN PATENT DOCUMENTS

| | | |
|---|---|---|
| WO | 2017198270 A1 | 11/2017 |
| WO | 2017198271 A1 | 11/2017 |

OTHER PUBLICATIONS

International Search Report and Written Opinion for corresponding PCT Patent Application No. PCT/EP2019/074028 dated Dec. 4, 2019. 16 pages.

Extended European Search Report in corresponding European Patent Application No. 18196477.6 dated Mar. 28, 2019. 7 pages.

* cited by examiner

NOISE CONTROL OF WIND TURBINE

CROSS-REFERENCE TO RELATED APPLICATIONS

This application is a national stage entry of PCT Application No. PCT/EP2019/074028 having a filing date of Sep. 10, 2019, which claims priority to European Patent Application No. 18196477.6, having a filing date of Sep. 25, 2018, the entire contents of which are hereby incorporated by reference.

FIELD OF TECHNOLOGY

The following relates to a method of adapting noise emission configuration of plural wind turbines, a wind park controller, a wind park and a method of controlling noise emission of singular or plural wind turbines.

BACKGROUND

Wind turbines generate noise during operation, i.e. when they are rotating and producing electric energy. Thus, wind turbines emitting noise disturb the environment. In places where wind turbines are installed near buildings, such as private buildings, the noise emission may be required to stay below a legal maximum sound pressure level. In particular, the total sound pressure at a neighbour location may be required to not exceed a given threshold level.

In order to conventionally reduce noise emission from wind turbines, the rotational speed (of the rotor at which plural rotor blades are mounted) has been reduced. The reduction of the rotational speed results in a reduction of the emitted noise. As the torque is normally limited, the maximum power will also be reduced, when the rotational speed is reduced. Thus, conventional methods for reducing noise will normally result in a significant reduction in the yearly electric energy production, typically 2-4% less annually per decibel noise reduction.

Also the blade pitch angle has an impact of the noise emission and can be configured in combination with the speed setpoint.

Conventionally, the maximum noise level for each wind speed may be calculated and a fixed noise curtailment as a function of wind speed is defined for the turbines in a wind farm. Thereby, noise at plural neighbour locations may be kept below the noise limit. Thereby, conventionally, it is assumed that the wind speed is the same for all wind turbines in the wind farm and that all wind turbines are in operation.

The conventionally known methods of noise control may have in particular the disadvantage that the electric energy or electric power output is considerably reduced.

Thus, there may be a need for a method of adapting rotational speed set points, there may be a need for a method of controlling rotational speed of plural wind turbines and there may be a need for a wind park controller and a wind park, wherein noise emission regulations are met and power output of the wind park is improved.

SUMMARY

According to an embodiment of the present invention it is provided a method of adapting noise emission (in particular adapting the rotational speed set points) of plural wind turbines, the method comprising: determining total wind turbine related noise levels at singular or plural locations; determining, among the plural locations, a critical location having a most critical, in particular highest, total wind turbine related noise level; if the most critical total wind turbine related noise level is above a noise threshold (e.g. defined for the critical location): reducing the noise emission (in particular reducing the rotational speed set point) of a wind turbine having the highest noise to power impact ratio (e.g. to the critical location or averaged over all locations).

As used within the current application, adapting noise emission of plural wind turbines may include (e.g. combined) adapting a set of noise related operational parameters including pitch angle offset and/or rotational speed, in particular maximum speed, and/or yaw angle misalignment offset.

Further, reducing the noise emission may include adapting the setpoints of noise related operational parameters such as to reduce noise.

In particular, adapting noise emission of plural wind turbines may include adapting rotational speed set points of the wind turbines. Further, reducing the noise emission may include reducing the rotational speed set point. Further measures may be applied to adapt, in particular reduce, noise emission, such as changing blade pitch angles, yawing angle, defining other electrical reference values etc.

Noise level in general may refer to sound pressure or sound power or the dB values of these. The total wind turbine related noise level at a particular one of the plural locations may not comprise noise which is not related to any of the wind turbines of the wind park, but may be related to other environmental noise, such as from traffic, construction work, industry and so on. Each of the total wind turbine related noise level for each of the plural locations may be determined from individual wind turbine related noise levels, such as by adding up these levels. The total wind turbine related noise levels may for example be determined using a noise model modelling the noise emissions of each wind turbine depending on operational conditions and/or on environmental conditions and/or distance and/or direction to the respective one of the plural locations. Conventionally known noise models may be utilized for this purpose, as is known to the skilled person. Thereby, e.g. any propagation model (e.g. Nord2000 or ISO model, etc.) may be utilized.

One or more of the plural locations may experience total wind turbine related noise levels which are below respective noise thresholds. Other of the plural locations may experience noise levels which are above respective noise levels. The critical location is the location among the plural locations which has the most critical total wind turbine related noise level. For example, this critical location may have the highest total wind turbine related noise level among all other locations. For this critical location, noise reduction may be required. Thus, if the most critical total wind turbine related noise level is above a noise threshold, then the rotational speed set point of at least one wind turbine may be reduced. The wind turbine which has the highest noise to power impact ratio to the critical location may have the best prospect for reducing the noise while only marginally reducing power output. Thus, this particular wind turbine which has the highest noise to power impact ratio to the critical location is selected and its rotational speed set point is reduced.

The method may then cyclically be repeated. For example, in a next circle or in a next round, another location may be determined as a critical location and another wind turbine may be adjusted regarding its rotational speed set point in order also to reduce the noise at the new determined critical location. The method may cycle during the entire operational time of the wind park or the wind turbines.

Thereby, it may be ensured that noise emission requirements are met while the power output is not extraordinarily reduced.

The noise to power impact ratio may be considered as a ratio between the noise level and the power output of the respective wind turbine. If the noise to power impact ratio is large, the noise emission is reduced by a large amount when the power output is decreased (involving reducing the rotational speed). If the noise to power impact ratio is low, the noise emission of the respective wind turbine is only slightly reduced when the power output is reduced (involving reducing the rotational speed). Thus, choosing the wind turbine having the highest noise to power impact ratio for reduction of its rotational speed set point may be most effective for reducing the noise level at the critical location. The respective noise to power impact ratio may be stored for all individual wind turbines, for example in a look-up table, and may comprise as columns e.g. noise, power and the noise to power impact ratio. In particular embodiments, the power impact ratio for one considered wind turbine may be constant not depending on the power output.

According to an embodiment of the present invention, the most critical total wind turbine related noise level is that one of the total wind turbine related noise levels for which a noise difference between the total wind turbine related noise level at a considered location and the noise threshold defined for the considered location is maximal.

If for example all total wind turbine related noise levels for all locations are above the respective noise thresholds, the most critical total wind turbine related noise level may be the one which is highest above the respective threshold. If for example according to another example, all total wind turbine related noise levels are below the respective threshold, the most critical total wind turbine related noise level may be the one which is closest below the respective threshold. The noise difference between the total wind turbine related noise level of a considered location and the noise threshold defined for the considered location may be calculated in a simple manner and also the maximum of these noise differences may be determined, from which the most critical total wind turbine related noise level can be derived and thus also the critical location can be derived in a simple manner. Thereby, the method may be simplified and accelerated.

According to an embodiment of the present invention, reducing the rotational speed set point of a wind turbine having the highest noise to power impact ratio is performed by a predetermined speed decrement and/or change of the blade pitch angle When the rotational speed is reduced by a predetermined speed decrement, the method may be simplified. In other embodiments, the rotational speed set point may be decreased by a decrement which may depend on for example the noise difference between the noise level which is generated by the considered wind turbine at the critical location and the respective threshold. Thereby, a more effective noise reduction may be achieved.

According to an embodiment of the present invention, the method further comprises if the most critical wind turbine related noise level at the critical location is below the noise threshold (e.g. defined at the critical locations): increasing the rotational speed set point of a wind turbine having the lowest noise to power impact ratio (e.g. to the critical location), thereby not exceeding a nominal rotational speed.

If the most critical wind turbine related noise level is below the noise threshold, then all wind turbine related noise levels at all locations will be below the noise threshold. Thus, if any of the wind turbines is operated below the nominal speed, one or more of these (curtailed) wind turbines may be operated at slightly higher rotational speeds. In this situation, the wind turbine having the smallest impact on the noise level at the critical location is determined and its respective rotational speed is increased. Thereby, the risk that one or more of the noise thresholds are exceeded is reduced, while the energy output may be increased.

According to an embodiment of the present invention, increasing the rotational speed of a wind turbine having the lowest noise to power impact ratio is performed by a predetermined speed increment. When the rotational speed of the wind turbine having the lowest noise to power impact ratio is increased by a predetermined speed increment, the method may be improved and accelerated and simplified. In other embodiments, the increment by which the rotational speed is increased may depend on the respective most critical total wind turbine related noise level or a difference between the most critical total wind turbine related noise level and the respective noise threshold. If for example this difference is (negative and) relatively large (as absolute value), the rotational speed of the considered wind turbine may be increased by a larger amount than in the case where this difference is (negative and) relatively small (in absolute values). Thereby, energy production or power production may be increased without violating noise level requirements.

According to an embodiment of the present invention, determining the total wind turbine related noise levels at the plural locations comprises: determining individual wind turbine related noise levels at the plural locations for each of the plural wind turbines, in particular applying a noise model; and determining the total wind turbine related noise levels at the plural locations based on the individual wind turbine related noise levels at the plural locations, in particular by forming a sum of individual wind turbine related noise levels.

All wind turbine-location pairs of wind turbines and locations may be considered and the respective noise contribution of each wind turbine to each of the plural locations may be determined, in particular using the noise model. The individual wind turbine related noise levels for a considered location may then be summed to determine the total wind turbine related noise level for this considered location. Thereby, the method may be simplified.

According to an embodiment of the present invention, the method further comprises determining the wind turbine having the highest noise to power impact ratio (e.g. to the most critical location); and/or determining the wind turbine having the lowest noise to power impact ratio (e.g. to the most critical location).

The determination of the highest and/or lowest noise to power impact ratio may also involve application of a model which not only models noise emissions but also power output of the wind turbine. The noise to power impact ratio may (generally or in this embodiment) also be calculated as a derivative of noise as a function of power output.

According to an embodiment of the present invention, determining total wind turbine related noise levels and/or determining individual wind turbine related noise levels at the plural locations is based on: an actual rotational speed of the respective wind turbine and/or a pitch angle of the respective wind turbine and/or a yaw angle of the respective wind turbine and/or a distance between the respective wind turbine and the respective location and/or direction angle between a rotation shaft of the respective wind turbine and the respective location and/or at least one air parameter, in particular air temperature and/or air humidity and/or air pressure, and/or a nacelle direction and/or at least one measured noise level.

To determine the noise levels wind speed and/or wind direction may not be necessary to be directly measured or may not be necessary at all. Instead, wind speed may be estimated based on pitch angle and/or rotor speed and/or power output.

Instead of wind direction the nacelle position may be used for determination of noise levels. If the turbine is configured to have a yaw misalignment offset, it is the position of the nacelle and not the wind direction which is important for the noise emission pattern.

Thereby, all relevant parameters for appropriately and accurately modelling noise emissions and/or power output and/or rotational speed of the wind turbine may be available for the method. Different noise models may require one or more of the aforementioned parameters as input.

According to an embodiment of the present invention, the method further comprises setting a yaw offset set point and/or pitch angle set point to at least one wind turbine, in particular the wind turbine having the highest noise to power impact ratio (e.g. to the critical location). Pitching the blade angle in positive direction will reduce noise. Pitching the blade angle may normally have a lower noise/power ratio than changing speed setting.

Thereby, for example, the noise emission direction generated by a particular wind turbine may be changed in order to not (or only slightly) affect the noise level as determined at a particular, in particular the most critical location.

According to an embodiment of the present invention, method steps are performed repeatedly, in particular regularly with a predetermined time interval, in particular between 30 seconds and 5 minutes, and/or wherein the method is performed by a central park controller. The method may be performed during normal operation of the wind park.

According to an embodiment of the present invention, the locations are positions at which noise levels are required to meet certain criteria, in particular be below noise thresholds. Thus, when the method is performed, local regulations regarding noise levels may be met.

According to an embodiment of the present invention, plural location specific noise thresholds are defined or all noise thresholds are the same. For example, noise thresholds may be defined at houses around the wind park.

According to an embodiment of the present invention it is provided a method of controlling rotational speed of plural wind turbines, the method comprising: performing a method according to one of the preceding embodiments; and adjusting the rotations speed of the wind turbines according to the determined rotational speed set points.

Furthermore, a wind park controller which is adapted to control or carry out a method of adapting rotational speed set points of plural wind turbines and/or which is adapted to carry out a method of controlling rotational speed of plural wind turbines is provided, as described in one or more of the above-mentioned embodiments.

Furthermore, a wind park comprising the wind park controller is provided according to an embodiment of the present invention.

The aspects defined above and further aspects of the present invention are apparent from the examples of embodiment to be described hereinafter and are explained with reference to the examples of embodiment. The present invention will be described in more detail hereinafter with reference to examples of embodiment but to which the present invention is not limited.

BRIEF DESCRIPTION

Figure 2:
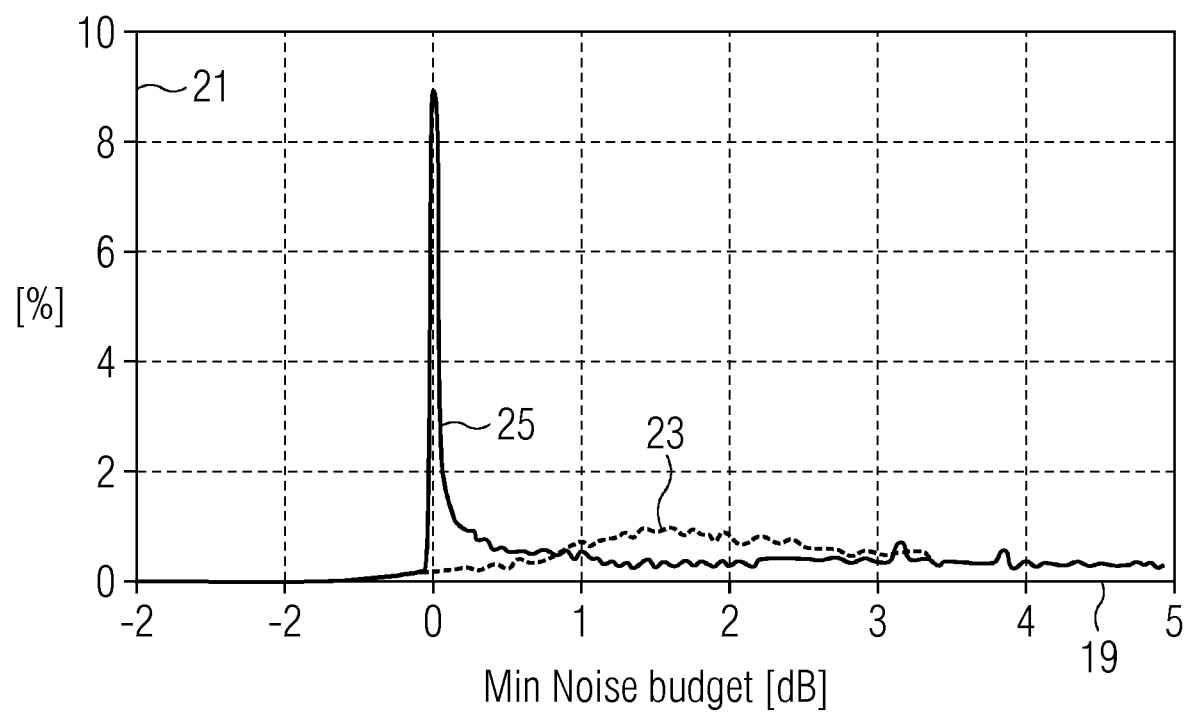

Some of the embodiments will be described in detail, with reference to the following figures, wherein like designations denote like members, wherein:

FIG. 1 schematically illustrates a wind park according to an embodiment of the present invention including a wind park controller according to an embodiment of the present invention which is adapted to carry out a method according to an embodiment of the present invention; and FIG. 2 shows graphs illustrating the performance of a method according to an embodiment of the present invention compared to a conventional method.

DETAILED DESCRIPTION

The illustration in the drawings is in schematic form.

The wind park 1 according to an embodiment of the present invention comprises plural wind turbines 3a, 3b, 3c, 3d having respective rotors 2 at which rotor blades 4 are mounted and further comprises a wind park controller 5 according to an embodiment of the present invention which is adapted to control or carry out a method of adapting rotational speed set points of plural wind turbines 3a, 3b, 3c, 3d and/or is adapted to carry out a method of controlling the rotational speed of plural wind turbines 3a, 3b, 3c, 3d according to embodiments of the present invention.

Thereby, during the method, total wind turbine related noise levels are determined at plural locations 7a, 7b, 7c, 7d which may be located at houses for example around the wind park 1. The total wind turbine related noise levels (according to a first scenario) are indicated by respective columns 9a, 9b, 9c, 9d having a height corresponding to the strength of the total wind turbine related noise levels. Columns 11a, . . . , 11d indicate respective noise thresholds also depicted as columns, their height indicating the strength of the noise threshold.

During the method, in the first scenario location a critical location 7c, is determined which has a most critical, in particular highest, total wind turbine related noise level 9c. In particular, the difference between the total wind turbine related noise level 9c and the respective noise threshold 11c for the location 7c is highest among all locations 7a, 7b, 7c, 7d. Thus, location 7c is determined as the critical location. As can be taken from the columns 9c, 11c, the most critical total wind turbine related noise level 9c is above the noise threshold 11c. In this first scenario, it is identified a wind turbine (in the illustrated example wind turbine 3b) which has the highest noise to power impact ratio. In particular, the wind turbine 3b is closest to the critical location 7c and reducing its rotational speed set point most effectively results in a decrease of the noise level as experienced at the location 7c. Thus, the rotational speed set point of the wind turbine 3b is reduced, for example by a predetermined speed decrement. The method is then continuously and repeatedly performed.

According to another second scenario supported by the method instead of the total wind turbine related noise levels 9a, 9b, 9c, 9d, the total wind turbine related noise levels 13a, 13b, 13c, 13d are determined. As can be taken from FIG. 1, all these noise levels in the second considered scenario are below the respective noise thresholds 11a, 11b, 11c, 11d. Further, anyway, a critical location (in the illustrated example location 7d) is determined as the one whose total wind turbine related noise level 13d is closest to the respective threshold 11d. Thus, the noise difference between the total wind turbine related noise level 13d and the respective noise threshold 11d is maximal among all locations 7a, 7b, 7c, 7d.

In a further method step (in the second scenario), the wind turbine (in the considered example wind turbine 3a) is identified which has the lowest noise to power impact ratio for the critical location 7d. In fact, from FIG. 1 it becomes obvious that the wind turbine 3a is farthest away from the critical location 7d. In another method step, the rotational speed set point of the wind turbine 3a is increased, in particular, by a predetermined speed increment.

It should be understood that the total wind turbine related noise level at each location is calculated as the sum of individual wind turbine related noise level as generated by the individual wind turbines 3a, 3b, 3c, 3d. The individual wind turbine related noise levels are calculated using a noise model. For adjusting the noise emission (in particular adjusting rotational speed set point), the wind park controller 5 supplies control signals 15a, 15b, 15c, 15d to controllers 6 of the respective wind turbines 3a, 3b, 3c, 3d. Furthermore, the central park controller receives operational data 17a, 17b, 17c, 17d from the individual wind turbines based on which, using a noise model, the central controller determines the respective noise levels at the respective locations. The park controller 5 may receive also location information regarding the plural locations 7a, 7b, 7c, 7d, and/or other environmental data relating to wind 14, such as wind speed, wind direction etc.

An embodiment of the present invention is to utilize that the turbines are not experiencing the same conditions (different noise source level, for example due to wake operation), and the emission of the noise from the turbine is not the same for different angles relative to the turbine rotor (noise source directivity). In addition, the damping of the sound during the propagation to the neighbours, for example the locations 7a, 7b, 7c, 7d (for example due to air absorption) may depend on the atmospheric conditions.

The FIG. 2 illustrates in a coordinate system having an abscissa 19 indicating the minimum noise budget in decibel and having an ordinate 21 indicating the percentage, a distribution (histogram) of the calculated historical noise budget. Thereby, 0 decibel means that the noise is exactly on the noise limit, 1 decibel means that the noise could be 1 decibel higher and still stay under the threshold. Thereby, the curve 23 shows the distribution of the noise budget with the conventional noise control method. The curve 25 shows an example of a distribution as achieved using embodiments of the present invention with simulated active noise control, wherein the noise is increased to just stay below the limit.

According to an embodiment of the present invention, a central park controller is provided which is calculating the noise emission configuration for all the wind turbines in the wind farm 1. Thereby, according to an embodiment, the noise emission configuration (in particular rotational speed set point(s)) may be recursively calculated by the following steps:

1. Calculate the actual noise impact of each of the wind turbines for all relevant neighbour locations, for example locations 7a, 7b, 7c, 7d.
2. Calculate the actual total noise (for example 9a, 9b, 9c, 9d or 13a, 13b, 13c, 13d) for all relevant neighbour locations (for example location 7a, 7b, 7c, 7d)
3. Identify the neighbour location with the most critical (highest) noise level
4. Calculate the turbine with the highest and the lowest noise/power impact ratio (in particular for the critical neighbour location or for an average of all locations)
5. If the noise level is higher than the threshold level, then reduce noise emission configuration, in particular speed set point of the wind turbine with the highest noise/power impact ratio by a small quantity
6. If the noise level is lower than the threshold level, then increase noise emission configuration, in particular speed set point, of the wind turbine with the lowest impact which is curtailed by a small quantity.

The above steps 1 to 6 may for example be repeated for example every 1 min (or a longer/shorter time interval).

According to an embodiment of the present invention, the noise calculation may be based on data for turbine noise emission as a function of direction, distance, rotor speed, and pitch angle. It could be extended with dependency to air temperature, humidity and pressure or other atmospheric parameters. It could also be extended with dependency on measured sound levels with one or more microphones, anywhere between or beyond the wind turbine and the neighbour locations. In this way, a closed-loop controller may be obtained.

The noise threshold may depend on local noise regulations and may be a function of the wind speed of the turbine or average of turbines close to a neighbour location and may also be a function of time and day. It could also be extended with a safety margin as a function of turbulence and air density or other factors affecting the noise.

Besides calculating the optimum speed set point, as described above, the central park controller (for example controller 5) may also introduce intentional yaw offsets or other control changes (such as pitch angle) to the individual turbines. For example, a yaw offset may affect the source noise of down wind turbines by changing the turbulence intensity and mean flow speed. Moreover, an intentional yaw offset may also affect neighbour noise levels due to the directivity of the wind turbine noise. Instead of simply curtailing (speed reduction) the most critical turbine, it could be more efficient (in terms of the annual energy output) to yaw the turbine in order to divert the main noise radiation away from the nearest neighbour.

Preliminary simulations with data from two existing wind farms indicate that the annual energy production can be increased by up to 4% with this technology, depending on how advanced the noise model is.

Additionally, a microphone may be installed at each location and then control the noise level according to that measured noise level, thereby achieving a closed-loop feedback. However, it may be difficult to distinguish the noise generated by the wind turbines from other environmental noise, such as traffic noise or a crying baby.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. A method of adapting noise emission configuration of a plurality wind turbines, the method comprising:
    determining total wind turbine related noise levels at a plurality of locations;
    selecting a critical location from the plurality of locations that has a highest difference between the total wind turbine related noise level of a considered location and a noise threshold for the considered location, among all of the plurality of locations;
    determining that the total wind turbine related noise exceeds the noise threshold;
    selecting a wind turbine from the plurality of wind turbines that is closest to the critical location and has a highest noise to power impact ratio for reducing a noise level at the critical location;
    reducing a rotational speed setpoint of the selected wind turbine; and
    diverting a main noise radiation of the selected wind turbine away from the critical location introducing a yaw offset which yaws the selected turbine.

2. The method according to claim 1, wherein the most critical total wind turbine related noise level is that one of the total wind turbine related noise levels for which a noise difference between the total wind turbine related noise level of a considered location and the noise threshold defined for the considered location is maximal.

3. The method according to claim 1, wherein reducing the rotational speed setpoint is performed by a predetermined speed decrement.

4. The method according to claim 1, further comprising:
    if the most critical wind turbine related noise level at the critical location is below the noise threshold:
    selecting a wind turbine having a lowest noise to power impact ratio to the critical location, and
    increasing the rotational speed setpoint of the selected wind turbine, thereby not exceeding a nominal rotational speed.

5. The method according to claim 4, wherein increasing the rotational speed setpoint of the wind turbine having the lowest noise to power impact ratio is performed by a predetermined speed increment.

6. The method according to claim 1, wherein determining the total wind turbine related noise levels at the plurality of locations comprises:
    determining individual wind turbine related noise levels at the plurality of locations for each of the plurality of wind turbines by applying a noise model; and
    determining the total wind turbine related noise levels at the plurality of locations based on the individual wind turbine related noise levels at the plurality of locations by forming a sum of individual wind turbine related noise levels.

7. The method according to claim 6, wherein determining total wind turbine related noise levels and/or determining individual wind turbine related noise levels at the plurality of locations is based on:
    an actual rotational speed of the respective wind turbine and/or
    a pitch angle of the respective wind turbine and/or
    a yaw angle of the respective wind turbine and/or
    a distance between the respective wind turbine and the respective location and/or
    direction angle between a rotation shaft of the respective wind turbine and the respective location and/or
    at least one air parameter, and/or
    a nacelle direction and/or
    at least one measured noise level.

8. The method according to claim 1, further comprising:
    setting a pitch angle set point to the selected wind turbine to reduce noise emission of the wind turbine having the highest noise to impact ratio, in addition to reducing the rotational speed setpoint and introducing the yaw offset.

9. The method according to claim 1, wherein method is performed regularly with a predetermined time interval between 30 seconds and 5 minutes, and/or wherein the method is performed by a central park controller.

10. The method according to claim 1, wherein the plurality of locations are positions at which total wind turbine related noise levels are required to meet certain criteria.

11. The method according to claim 1, wherein the noise threshold is location specific.

12. A method of controlling rotational speed of a plurality of wind turbines, the method comprising:
    performing the method according to claim 1; and
    adjusting the rotational speed of the wind turbines according to the determined noise emission configurations.

13. A wind park controller, adapted to control or carry out a method according claim 1.

14. A wind park comprising a wind park controller according to claim 13.

15. The method according to claim 1, wherein the noise threshold is consistent for all of the plurality of locations.

16. The method according to claim 1, wherein the method is cyclically repeated, and for at least one cycle after an initial cycle, a new critical location is determined, forming a basis for selecting a wind turbine from the plurality of wind turbines that has a highest noise to power impact ratio for reducing a noise level at the new critical location.

\* \* \* \* \*